United States Patent [19]

Williams

[11] 3,987,818
[45] Oct. 26, 1976

[54] SAFETY TRIP VALVE FOR STEAM OR GAS TURBINES WITH MEANS TO ASSURE CONTROLLED OPENING FROM THE CLOSED POSITION

[75] Inventor: John G. Williams, Warren, N.J.

[73] Assignee: Turbodyne Corporation, Wellsville, N.Y.

[22] Filed: June 19, 1975

[21] Appl. No.: 588,409

[52] U.S. Cl. .............................. 137/630.13; 251/25
[51] Int. Cl.² ........................................ F16K 31/143
[58] Field of Search .................... 251/14, 25, 35, 42; 137/630.13

[56] References Cited
UNITED STATES PATENTS

| 338,771 | 3/1886 | Page | 251/25 |
|---|---|---|---|
| 2,016,460 | 10/1935 | Sorensen | 251/42 X |
| 2,307,628 | 1/1943 | Ludeman | 251/36 |
| 2,734,712 | 2/1956 | Fraser | 251/42 X |
| 3,712,578 | 1/1973 | Dawson | 251/42 X |

*Primary Examiner*—Arnold Rosenthal
*Attorney, Agent, or Firm*—Daniel H. Bobis

[57] ABSTRACT

A safety trip valve for interrupting the flow of working fluid to fluid operated machinery is actuated to closed position by unbalanced forces produced thereon by the pressure of the working fluid on occurrence of adverse operating conditions. After closure of the trip valve, pressure force unbalance is maintained by a pressure responsive transfer valve assembly in the trip valve which prevents sudden automatic opening of the trip valve when the adverse operation condition is corrected. A mechanical positioner in operative association with the transfer valve allows the working fluid to produce a net force in the opening direction, which causes the trip valve to follow the mechanical positioner as it is moved by the operator from closed to open position.

4 Claims, 10 Drawing Figures

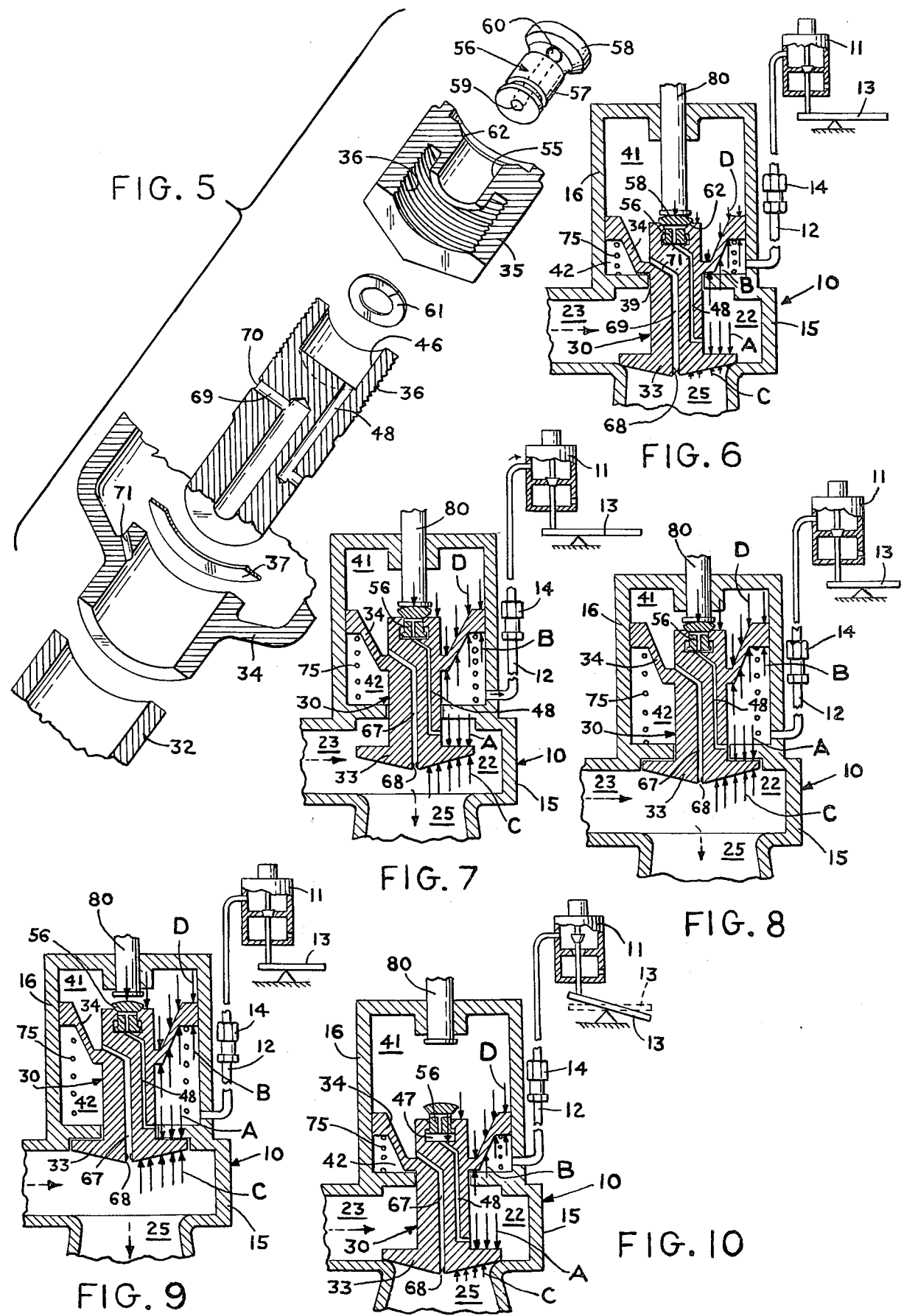

SAFETY TRIP VALVE FOR STEAM OR GAS TURBINES WITH MEANS TO ASSURE CONTROLLED OPENING FROM THE CLOSED POSITION

BACKGROUND OF THE INVENTION

This invention relates generally to turbines which use steam or other vapors or gases at high pressures and temperatures as the working fluid. More particularly it relates to a manually positionable safety trip valve with automatic closing from any position when called for by adverse operating conditions and means generally manual to control opening movement when the adverse operating condition is corrected.

A trip valve system of the type to which this invention pertains was described in my prior U.S. Pat. No. 3,556,463. A further improvement to control the velocity of the trip valve elements when it is automatically moved to closed position to prevent excessive impact forces during such closing movement is disclosed in my co-pending application, Ser. No. 564,698, filed Apr. 3, 1975.

A feature of the invention covered by my U.S. Pat. No. 3,556,463 was the incorporation of snubbing or cushioning chambers to slow the moving parts of the trip valve as they are moved from the closed to open position on automatic response to correction of the adverse operating condition.

Experience with trip valves made in accordance with my prior patent has shown that the last mentioned objective was attained for valves in a range up to 3 inches. However, with larger sized valves the physical size of the turbines and the driven equipment increases exponentially. The larger inertia of the rotors of the turbine and the driven equipment thereon at all times requires slow controlled starting by the operator to avoid physical damage to the rotary components of the turbine due to abrupt opening action of the trip valve when the adverse operating condition for tripping the valve to closed position is corrected. The present invention acts to prevent the trip valve from leaving the closed position until an external control has been applied to the moving elements of the trip valve, and then to permit opening only as the external control dictates. As in the prior art device, automatic tripping to the closed position will occur from any operating position of the trip valve whenever called for by an adverse operating condition of the associated turbine or like device. However, the trip valve will not leave the closed position until the external positioning means is used to control opening of the trip valve.

This arrangement also provides a collateral advantage in that the operator can control the opening rate of the trip valve from the closed position without shutting off or throttling the steam supply upstream of the trip valve, and thus prevent any adverse operating conditions from occurring in the associated turbine when steam or other operating fluid is readmitted to place the turbine back into operation.

SUMMARY OF THE INVENTION

Thus, the present invention covers a safety trip valve having a valve housing defining, a flow chamber with an inlet and an outlet, a valve seat in the housing forming a valve port for passing fluid from the inlet to the outlet of the flow chamber, and a trip valve assembly slidably disposed in a valve guide in the valve housing including, an actuating piston at the upper end, a valve head at the lower end for engaging the valve seat so as to open and close the valve port on movement of the trip valve assembly, said actuating piston forming an inboard actuating chamber and an outboard actuating chamber inside said valve housing, means forming fluid flow passages in said trip valve assembly to permit operating fluid to pass to said inboard actuating chamber and said outboard actuating chamber to provide pressure forces on opposite sides of said actuating piston for moving said trip valve assembly, spring means for biasing said trip valve assembly to open position when said pressure forces acting on opposite sides of said actuating piston are equalized, means on said valve housing for controlled venting of operating fluid from the inboard actuating chamber to move the trip valve assembly to closed valve position, transfer valve means on said trip valve assembly to control the flow of operating fluid through the passage way for maintaining unbalanced pressure forces on the actuating piston so as to hold the trip valve assembly in the closed position, and a positioning means on the trip valve housing disposed for operative engagement with the transfer valve means to change the direction of the unbalanced pressure forces on the trip valve assembly and to cause the same to follow the positioning means, and means for moving the positioning means so as to move said transfer valve means from closed to open position.

Accordingly, it is an object of the present invention to provide a safety trip valve which is actuated from closed to open position and from open to closed position by steam of other operating fluid which is used to drive the steam turbine or other device with which the safety trip valve is associated.

Additionally, it is the principal object of the present invention to provide a safety trip valve for selectively controlling the unbalanced pressure forces tending to move the trip valve from closed to open position.

Another object of the invention is to provide a safety trip valve wherein the stresses in parts of the trip valve due to impact forces during opening movement are greatly reduced.

Still another object of this invention is to provide a trip valve which can be opened only as permitted by an external operator after the adverse operating conditions have been corrected, and also to provide optimum starting loads for the associated steam turbine or like device.

Other objects and advantages of the invention including the basic design and the nature of the improvements thereon will appear from the following description taken in conjunction with the accompanying drawings, in which:

FIG. 5 is an exploded perspective view of the transfer valve and portions of the associated parts partly sectioned to show the fluid passages therethrough.

FIG. 6 is a schematic diagram showing the trip valve in the closed position and the operator has extended the external positioner to engage the transfer valve therein. The pressure forces to bias the moving elements upward in contact with the external positioner are illustrated by arrows.

FIG. 7 is a schematic diagram of the elements of the trip valve in an intermediate or partly open position following the upward movement of the positioner. The pressure forces to bias the moving element upward in contact with the external positioner are illustrated by arrows.

FIG. 8 is a schematic diagram showing the trip valve in the full open position but with the transfer valve still closed by the positioner. The pressure forces acting in the trip valve are illustrated by arrows.

FIG. 9 is a schematic diagram showing the relative position of the elements of the trip valve and the actuating pressure force in the trip valve under normal operating conditions with the trip valve open are illustrated by arrows.

FIG. 10 is a schematic diagram similar to FIG. 6 showing the trip valve in closed position following a trip signal of adverse operating conditions. The pressure forces acting to hold the trip valve in the closed position are illustrated by arrows.

Figures 1, 2, 3, 4:
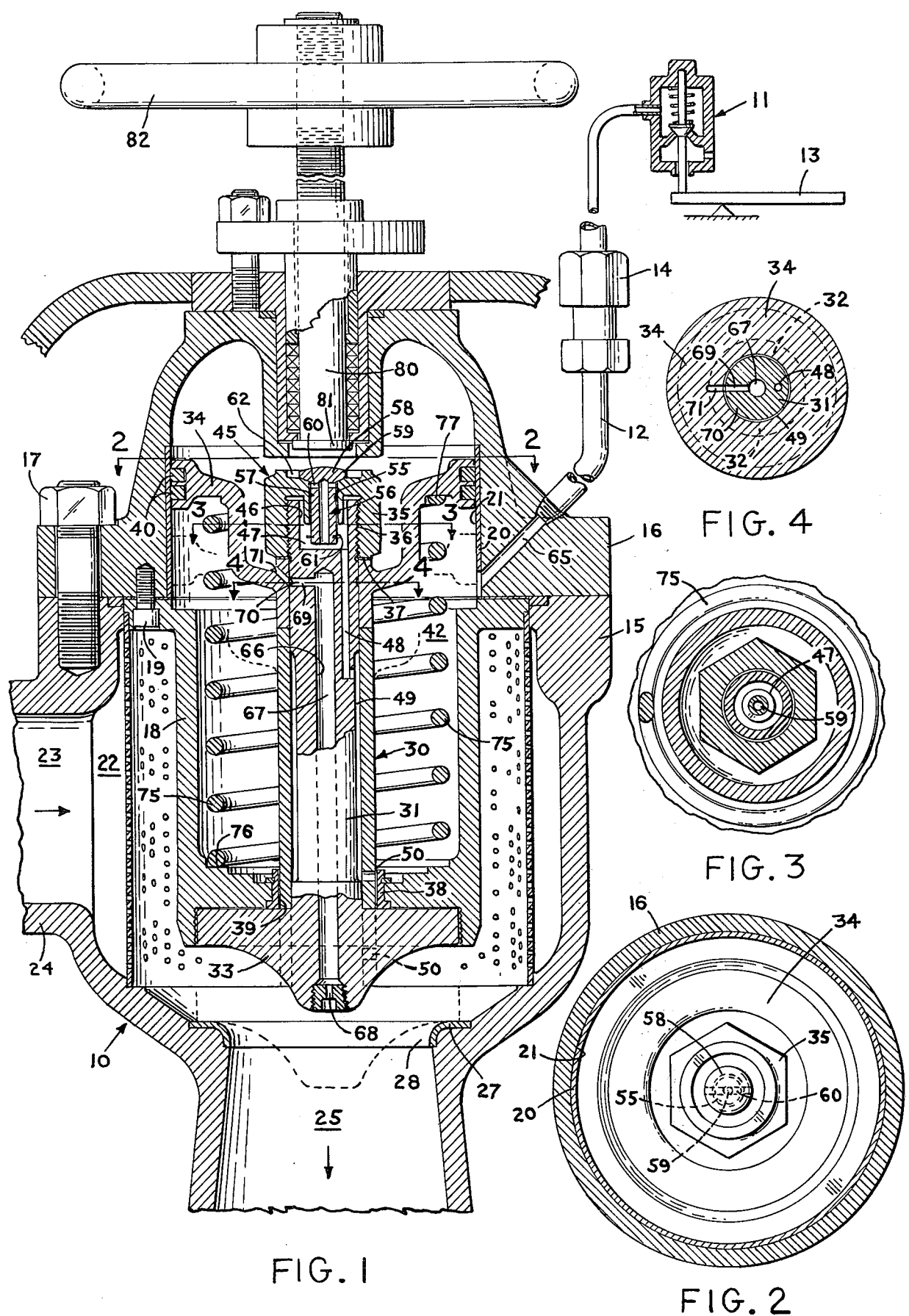
FIG. 1 is a vertical section of a safety trip valve system showing the position of the elements of the trip valve under the normal open operating conditions.
FIG. 2 is a cross-section taken on line 2—2 of FIG. 1.
FIG. 3 is a cross-section taken on line 3—3 of FIG. 1.
FIG. 4 is a cross-section taken on line 4—4 of FIG. 1.

Safety Trip Valve Systems are known in the prior art as is shown in U.S. Pat. No. 3,556,463 and is disclosed in my co-pending application U.S. Ser. No. 564,698 filed Apr. 3, 1975.

FIG. 1 of the drawings shows a substantially similar Safety Trip Valve System which differs from those in the prior art in that it includes a safety trip valve generally designated 10 in accordance with the present invention.

Safety trip valve 10 is operatively associated with an external pilot valve generally designated 11 which communicates with the safety trip valve through a fluid conduit 12 so that the safety trip valve 10 similar to the trip valve systems of the said prior art devices will be actuated to closed position when the pilot valve 11 is opened, responsive to adverse operating conditions. This is accomplished by means shown schematically as a lever 13 which actuates the external pilot valve 11 to open position when adverse operating conditions of the associated system occur, and signal lever 13 to such action.

An adjustable orifice 14 disposed in the conduit 12 limits the rate of flow of the operating fluid such as steam or other fluid therethrough to a predetermined value when the external pilot valve 11 is actuated to open position by the lever 13.

The details of this operation for moving the safety trip valve to closed position are described both in U.S. Pat. No. 3,556,463 and my co-pending application, and therefore will not be described further herein.

The construction of the safety trip valve 10 not only utilizes the advantages of the above mentioned prior art devices but further is constructed and operated to prevent the automatic opening of the safety trip valve 10 after it has been so actuated to the closed position.

Accordingly referring to FIGS. 1 to 5 of the drawings, the safety trip valve is shown as having a housing which includes a safety trip valve body 15 and a valve bonnet 16 which is attached to the valve body by means of a plurality of bolts 17.

A valve guide bracket 18 is attached to the lower portion of the valve bonnet 16 by means of a plurality of cirumferentially spaced bolts 19.

FIGS. 1 and 2 further show that the valve bonnet 16 has a replaceable sleeve 20 which is secured therein in assembled position so as to form a cylinder 21 the purpose of which will be described hereinafter.

The trip valve body 15 defines a flow passage or chamber generally designated 22 which is in communication with an inlet passage 23 formed by the inlet section 24 on the trip valve body, and spaced from the inlet passage 23 is an outlet passage 25 which is formed by the outlet section 26 generally at right angles to the inlet section 24.

The outlet section 26 will be connected to the turbine govenor valve of a steam turbine to which a safety trip valve in accordance with the present invention is particularly applicable.

Outlet passage 25 is shaped where it joins the flow chamber 22 so that a replaceable valve seat 27 can be mounted therein to provide a valve port 28.

A trip valve assembly generally designated 30 is supported by means of the valve guide bracket 18 and is guided in coaxial relationship with the valve seat 27 and valve port 28 to open and close the valve port so as to control the flow of steam or other operating fluid from the inlet passage 23 through the flow passage or chamber 22 and valve port 28 to the outlet passage 25 as will now be described in more detail.

TRIP VALVE ASSEMBLY

The trip valve assembly 30 includes a generally cylindrical member 31 which lies in the longitudinal line of a cylindrical sleeve 32 so that the lower end thereof extends below said sleeve to receive a valve head 33 against which the lower end of the sleeve 32 is shouldered when the valve head is connected in assembled position.

A piston 34 adjacent the upper end of the cylindrical member or valve stem 31 abuts the upper end of the sleeve 32 and is held in assembled position by means of a transfer valve body 35 which is connected to a threaded section 36 at the upper end of the cylindrical element 31 as is shown in FIG. 1 of the drawing.

A gasket 37 between the transfer valve body 35 and the upper end of the piston 34 provides a seal to prevent loss of steam or other operating fluid from the passages formed in the trip valve assembly which are important to the operation of the safety trip valve in accordance with the present invention as is more fully described below.

By reference to FIG. 1 it is thought clear that when the valve head, cylindrical element or valve stem 31, cylindrical sleeve 32, piston 34 and transfer valve body 35 are assembled as above described, they will form a single composite assembly and that this assembly when slidably disposed in the bearing member 38 in valve guide bracket 19 will lie in the longitudinal or axial line of the valve seat 27 and valve port 28 so that when the trip valve assembly 30 is moved towards and away from the valve seat 27 it will act to open and close the valve port 28 and thus control the flow of steam or other operating fluid from the inlet passage 23 to the outlet passage 25.

By further reference to FIG. 1 to 4 of the drawings, it will be seen that the valve stem sleeve 32 has a small clearance as at 39 with the bearing member 38 so as to provide a flow passage for steam or other operating fluid.

Piston 34 is provided with piston rings as at 40 which in assembled position will be disposed in sliding engagement with the cylinder 21 formed by the cylindrical sleeve 20 so as to permit the trip valve assembly to be moved axially in the bearing 38 in response to forces which are exerted on piston 34 during the operation thereof.

Further however piston 34 defines with the cylindrical sleeve 20 an outboard actuating chamber 41 in the valve bonnet 16 on the upper side of the piston 34 and an inboard actuating chamber 42 in the valve guide bracket 18 so that when steam or other operating fluid is admitted into the respective outboard and inboard actuating chambers the pressure of the operating fluid will exert forces on the respective upper and lower sides of the piston 34 which can act to move the trip valve assembly in the axial line of the valve seat 27 and valve port 28.

It is noted further that the effective diameter of the piston 34 is preferably so selected as to provide a larger cross-sectional area than the effective area of the valve head 33. This wll permit the pressure differential across the piston 34 to produce a greater longitudinal force for moving the trip valve assembly 30 than the same pressure differential across the valve head 33 for purposes that will appear clear from the description of the operation below.

Transfer valve body 35 not only acts to hold the elements of the trip valve assembly 30 in assembled position but further also form part of the transfer valve assembly and with a counter-bore 46 in the end of the cylindrical member 31 forms a fluid transfer chamber 47 as clearly shown in FIGS. 1 and 3 of the drawings.

Fluid is delivered to the fluid transfer chamber 47 through a first inlet conduit 48 formed or defined in the upper end of the valve stem or cylindrical element 31 which communiates as its upper end with the chamber 47 and at the lower end with a connecting passage which is formed by an undercut section of the valve stem or cylindrical element 31, the passage 49 in turn communicating at the end remote from the inlet conduit 48 with a radial bore as at 50 in the sleeve 32.

When the trip assembly is in full open position as shown in FIG. 1 the radial bore 50 will lie within the bearing 38 and when the trip valve assembly is in the closed position as shown by the dotted line in FIG. 1 the radial bore 50 will be in communication with the flow chamber 22 formed in the trip valve body 15 so that steam or operating fluid at inlet pressure will flow freely through the radial bore 50, passage 49 and inlet conduit 48 to the fluid transfer chamber 47 as the trip valve assembly approaches or is moved to the said closed position.

The transfer valve assembly operates to permit operating fluid to pass from the fluid transfer chamber 47 to the outboard actuating chamber 41.

Thus by reference to FIGS. 1, 2, 3 and 5 the transfer valve body is shown to include an axial bore as at 55 in which is slidably mounted the transfer valve 56. Transfer valve 56 has a cylindrical section as at 57 which engages the axial bore 55 and the outer or upper portion thereof includes an enlarged valve head 58 as is shown in FIGS. 1, 3 and 5 of the drawings.

A longitudinal bore or passage 59 in the cylindrical section communicates at one end with the fluid transfer chamber 47 and at the end remote therefrom with a cross bore 60 which opens on opposite sides of the enlarged head 58 so that when the transfer valve 56 is in the open position as shown in FIG. 1 of the drawings, fluid can pass from the chamber 47 through the longitudinal passage 59 and cross bore 60 to the outboard actuating chamber 41 of the trip valve 10.

Upward movement of transfer valve 56 relative to the transfer valve body 35 is limited by any suitable means such as a snap ring 61 located near the lower end of the cylindrical section 57 which will engage the transfer valve body during upward movement. During downward movement the enlarged head will engage a countersunk valve seat 62 and will seal and close the cross bore 60 so that flow of steam or other operating fluid from the fluid transfer chamber 47 through longitudinal passage 59 and cross bore 60 is prevented.

In order to obtain the desired closing action when the pilot valve 11 is actuated to open position the conduit 12 of external pilot valve 11 is disposed in fluid communication with the inboard actuating chamber 42 by means of a connecting passage 65 in the valve bonnet 16.

Further as in the prior art forms of safety trip valves the cylindrical element or valve stem 31 is provided with an axial bore 66 which forms a flow passage 67 in communication at one end with a flow restricting orifice 68 in the valve stem 31 and at the opposite end the flow passsge 67 intersects with a transverse passage 69 which terminates in a circumferential groove 70 on the outer circumference of the cylindrical element or valve stem 31 so that an inclined bore or passage 71 in the piston will align with and communicate with the transverse passage 69 at one end and the outboard actuating chamber 41 at the opposite end.

Whether fluid flows through the passage 67, transverse passage 69 and inclined passage 71 to the outboard actuating chamber or from the outboard actuating chamber will depend on the operating condition at which the safety trip valve 10 is operated.

The effect of the orifice 68 is to modify actuating pressures for these varying operating conditions as will be described hereinafter.

A trip valve spring 75 is disposed about the sleeve 32 and at one end engages a lower shoulder 76 on the valve guide bracket 18 and at the upper or opposite end the under or lower side 77 of the piston 34. The trip valve spring 75 exerts a relatively light force sufficient at no differential pressure across the piston 34 to bias the trip valve assembly 30 to the open position as is shown in FIG. 1 of the drawings.

Coating with the trip valve assembly as will be clear from the operation hereinafter set forth is a jackshaft 80 which is movable by threaded engagement with the valve bonnet 16 so that the jackshaft head 81 may be disposed to engage the transfer valve head 58 as required during the operation of the trip valve.

While the jackshaft is shown as being operated manually by the hand wheel 82 secured to the end thereof external to the valve bonnet 16, alternatively the jackshaft 80 can be turned by any other manual or remotely controlled means such as an electric motor, not shown, or any other type of positive positioner, not shown, which devices will be well known to those skilled in the art and therefore are not illustrated here.

OPERATION

FIGS. 6 to 10 show schematic illustrations for the various operating conditions of the safety trip valve 10 in accordance with the present invention, and illustrate diagrammatically by arrows the pressure forces produced by the pressure of the steam or other operating fluid that is acting in the trip valve housing.

FIG. 6 generally shows the position of trip valve 10 before it is moved to open position for initial start up.

In the position shown in FIG. 6 the jackshaft 80 is in engagement with the transfer valve head 58, the spring 75 is compressed, the pilot valve 11 is closed, and no adverse operating conditions are acting to cause the pilot valve 11 to move to open position.

Steam or other operating fluid at high temperature and high pressure will be acting in the chamber 22 in the valve body 15 and will pass through clearance space 39 into the inboard actuating chamber 42. The outboard actuating chamber 41 will be at exhaust pressure because it communicates with the outlet passage 25 through passages 71, 69, and 67 so long as the transfer valve assembly 45 is closed.

While the pressure forces due to the pressure fluid in the inboard actuating chamber 42 is upward because the pressure is acting against the greater surface represented by the underside of the piston 34 than the same pressure which is acting on the upper side of the valve head 33, as shown by the arrows A and B in FIG. 6, the trip valve assembly cannot open because the jackshaft is holding the trip valve assembly 30 and the transfer valve 56 respectively in closed position.

To open the safety trip valve 10, the operator must carefully retract and move the jackshaft 80 upward at the desired rate to bring the turbine up to operating load.

Since the pressure forces acting on the underside of the piston 34 are greater than those acting on the upper side of the valve head 33, the trip valve assembly 30 is forced to follow the upward movement of the jackshaft and this will cause the valve head 33 to open the valve port 28.

This will permit the steam or other operating fluid at high temperature and high pressure to now pass through the valve port 28 to the outlet passage 25 in communication with the turbine as is shown in FIG. 7.

Since the area of the piston 34 is greater than the area of the valve head 33 the net pressure forces will continue to keep the trip valve assembly 30 in contact with the jackshaft 80 as is indicated by the arrows A and B in FIGS. 8 and 9 of the drawings.

Since outlet passage pressure continues to rise as the valve head 33 is moved towards the full open position, steam at increasing pressure will act on the lower side of the valve head 33 as shown by the arrows and will pass through the orifice 68 and passages 67 and 71 to the outboard actuating chamber 41 where it will act on the upper side of the piston 34 as shown by arrow D.

However, as long as the trip valve assembly 30 is not fully open and the external pilot valve 11 is closed the resulting pressures are less than the pressures of the steam or other pressure fluid entering through inlet passage 23 acting in the inboard actuating chamber 42 and the resulting pressure forces coupled with the force exerted by the compressed spring 75 are sufficient to bias the trip valve assembly 30 to the full open position as shown in FIG. 7 of the drawings.

If the operator further retracts or moves the jackshaft 80 so that it loses contact with the transfer valve 56, the pressure forces will now equalize because the steam or other operating fluid can now pass freely through the fluid transfer chamber 47 becasue the pressure fluid acting there will bias the transfer valve 56 into open position and then this pressure fluid will flow into the outboard actuating chamber 41 and out through passage 67 and orifice 68 to the flow chamber or space to pass with incoming steam or other pressure fluid through the outer passage 25. The steam or other pressure fluid in the outboard actuating chamber 41 acts against the upper side of the piston 24 to balance the pressure force acting in the inboard actuating chamber 42 on the underside thereof. The outlet pressure in chamber 22 will also act on the lower face of the valve head 33, all of which is indicated by the uniform height of the arrows A, B, C and D in FIG. 9 of the drawings.

Thus as indicated schematically by the uniform length of the pressure arrows in FIG. 9, all components of the pressure forces acting on the trip valve assembly 30 are in equilibrium. The valve head 33 remains in the open position by virtue of the upward biasing force of trip valve spring 75 which is greater than the weight of the trip valve assembly 30.

When adverse operating conditions open external pilot valve 11, fluid is vented from the inboard actuating chamber 42 through conduit 12, adjustable orifice means 14 and external pilot valve 11 in the same way that this occurs in the prior art devices shown in my U.S. Pat. No. 3,556,463 and my co-pending application U.S. Ser. No. 554,698.

Fluid pressure is thereby decreased in inboard actuating chamber 42 and the resultant net pressure force on piston 34 and trip valve assembly 30 is downward and considerably greater than the upward force of trip valve spring 75. The trip valve assembly 30 is therefore moved to the closed position shown in FIG. 10 and spring 75 is compressed.

Inlet pressure will now act downward on valve head 33 and exhaust pressure upward thereon. As inlet pressure may be 600 psi or more, the exhaust pressure 30 psi more or less, the pressure differential in the downward direction on valve head 33 is very large and although it acts on the smaller area of the valve head the net force is downward and will act to hold the trip valve closed. Since the pressue acting in the inboard chamber 42 is also low because the steam or other pressure fluid is passing to the exterior pilot valve 11, the upward force on piston 24, is also relatively low.

Stream or other operating fluid entering through inlet passage 23 is now caused to flow through flow passages 50, 49 and 48 to the fluid transfer chamber 47 where it acts upward on transfer valve 56. This causes the transfer valve 56 to move to the open position. Fluid now can pass through the open transfer valve 56 to the outboard actuating chamber 41, thence through the valve stem passages 71, 70, 69 and 67 and flow-restricting orifice 68 to outlet passage 25, which is at low exhause pressure. This flow through the valve stem passages continues as long as the trip valve assembly 30 is held in the closed position and the transfer valve 56 remains in the open position all of which is shown clearly in FIG. 10 of the drawings.

The restrictive effect of orifice 68 will be selected to maintain the desired pressure in outboard actuator chamber 41 for maintaining the trip valve assembly 30 in the closed position.

As long as external pilot valve 11 is open, fluid will also flow from inlet passage 23 through external pilot valve 11, to provide an intermediate pressure in inboard actuating chamber 42, dependent on the restrictive effect of the clearance 39 and the adjustable orifice means 14. However, the pressure force as indicated by arrows B in FIG. 10 acting on piston 34, to raise it, will be small compared to the corresponding downward pressure force indicated by the arrows D and F in FIG. 10 on the piston 34 and on trip valve head 33, thus the trip valve will be kept in closed position.

When the operator corrects the adverse operating condition the external pilot valve will close, and the pressure in the inboard chamber 42 rises to equal inlet pressure and the steam or other pressure fluid will pass through port 50 and valve stem passages 49 and 48 to the transfer valve chamber 47 where it acts on the underside or end face of the transfer valve 56 so as to move the transfer valve 56 to open position thus permitting steam or other pressure fluid from the inlet passage 23 to flow through the axial bore 59 and transfer passage 60 therein to the outboard actuating chamber 41. From outboard actuating chamber 41 the steam or other pressure fluid flows through inclined passage 71, valve stem passage 67 and orifice 68 to the outlet passage 25 which is at a relatively low exhaust pressure of 30 psi more or less.

Since the inboard actuating chamber 41 and the outboard actuating chamber 42 are receiving steam or other pressure fluid from the same inlet passage source and because the area of the respective upper face and lower face or underside of the piston 34 against which this pressure fluid acts are substantially similar, any net pressure difference across the piston 34 arises as a function of the size limitation of the orifice 68 and will under the form of the orifice 68 here illustrated be relatively small and any net upward pressure force produced will be less than the downward pressure forces of the pressure fluid acting on the valve head 33. Accordingly, so long as the transfer valve 56 remains in the open position the net forces of the pressure fluid acting in the trip valve prevents the trip valve assembly 30 from moving from the closed position.

Thus, impact stresses that could produce physical damage by abrupt opening and uncontrolled admission of steam or other operating fluid to the turbine as heretofore occurred with the prior art devices are prevented.

REOPENING AFTER TRIP

To reopen the trip valve 10 and restore flow of steam or other operatingg fluid through the valve port 28 after the adverse operating condition is corrected and the external pilot valve 11 is closed, the operator must first lower jackshaft 80 so that it contacts the head 58 of the transfer valve 56 and forces the transfer valve against seat 62, as is shown in FIG. 6. Steam or other operating fluid entering through inlet passage 23 is thereby prevented from flowing through the transfer valve to the outboard actuating chamber 41. However, flow continues through valve stem passage 67 to the outlet passage 25 until the outboard actuating chamber 41 is at outlet or exhause pressure which is very low.

As a result of this condition, the pressure differential across the piston 34 then becomes equal and opposite to that across the valve head 33.

Due to the larger effective area of the piston a net resultant force is produced on the trip valve assembly 30 in the upward direction, to hold it against the jackshaft which is in contact with the transfer valve 56. The net upward resultant forces are indicated by the force arrows A and B in FIG. 6.

The operator can once again retract the jackshaft 80 as required to admit fluid to the turbine at the desired rate for resuming operating and picking up the load because this net upward resultant force on the trip valve assembly 30 will cause the same to follow the upward movement of the jackshaft 80 as above described for the initial start up as shown in FIG. 6 of the drawings.

The pressure forces continue to keep the trip valve assembly 30 in contact with the jackshaft, as may be seen by the arrows in FIG. 7. The pressure in the outlet passage and in the outboard actuating chamber will rise as the trip valve assembly 30 moves to open position. As in the case of the initial opening of the trip valve assembly, the pressure in the outboard actuating chamber will be less than that acting in the inboard actating chamber until the trip valve assembly is nearly in the full open position. When these pressures are equalized the force present in the compressed spring 75 is sufficient to bias the trip valve open, overcoming the weight of the moving parts.

The final position just before the operator relinquishes control by the jackshaft 80 is the same as that shown in FIG. 8.

Further retraction of the jackshaft restores the trip valve 10 to the normal operating position as shown in FIG. 9.

It will be noted that the jackshaft is not connected to the trip valve assembly 30, but is held in contact only by the upward forces acting on the trip valve assembly. Consequently, the automatic safety trip action is available at any point in the opening process shown in FIGS. 6, 7, 8 and 9 of the drawings, whenever called for by adverse operating conditions which cause the external pilot valve 11 to open, as described in connection with FIG. 10. It will be understood that once the trip valve assembly 30 is moved to closed position it cannot be opened or reopened until the jackshaft 80 is extended to force the transfer valve 56 to the closed position.

MANUAL THROTTLING CONTROL

With a safety trip valve according to the present invention it is also easily possible to throttle the flow of fluid to the turbine by extending the jackshaft 80 from the fully retracted running position of FIG. 9 to any intermediate trip valve position as shown in FIG. 7. If desired the trip valve assembly 30 can also be moved to the closed position shown in FIG. 6.

The position of the trip valve assembly 30 in either direction is under full control when in contact with the jackshaft as long as the trip valve assembly 30 is not tripped to the closed position by actuation of the external pilot valve 11 from closed to open position as above described.

It will be understood that the invention is not to be considered as limited to the specific construction or configuration of parts shown, but that they may be widely modified within the scope of the invention as defined by the claims.

What is claimed is:

1. A safety trip valve for controlling the flow of operating fluid at high temperatures and high pressure to a turbine comprising:
   a. valve housing means defining a flow chamber having, an inlet and an outlet in communication with said flow chamber,
   b. valve seat means in the valve housing means having a valve port therethrough for passing fluid from the inlet to the outlet,
   c. a trip valve assembly in the valve housing means having, a valve head for engagement with the valve seat means to open and close the valve port, and an actuating means for the valve head, d. means for delivering operating fluid from said inlet to said actuating means to provide pressure forces for maintaining the trip valve assembly in normally open position, e. means connected to said valve housing means responsive to adverse operating conditions to pass operating fluid acting on the actuating means to atmosphere so as to unbalance the inlet operating fluid pressure forces acting on said actuating means and to cause said trip valve assembly to move to closed position, f. transfer valve means connected to the actuating means on said trip valve assembly to balance opposed operating fluid pressure forces acting across said actuating means so as to aid in maintaining the trip valve assembly in closed position, and g. positioning means movably mounted on said valve housing and operatively associated with said transfer valve means to reverse the unbalanced forces on said actuating means whereby on opening movement of the positioning means the inlet operating fluid will exert pressure forces on the actuating means to cause the trip valve assembly to follow opening movement of said positioning means.

2. In a safety trip valve as claimed in claim 1 including, a. a valve guide in said valve housing, b. said trip valve slidably mounted in said valve guide and disposed to form an inboard actuating chamber in said valve guide on one side of said actuating means and outboard actuating chamber on the opposite side of said actuating means, and c. said transfer valve means disposed on said trip valve assembly so as to pass operating fluid to said outboard actuating chamber when said transfer valve is in the open position.

3. In combination with a safety trip valve as claimed in claim 2.

a. a normally closed external pilot valve means connected to the valve housing for venting said inboard actuating chamber when said pilot valve means is moved to open position, and b. means on said pilot means for regulating the rate at which said inboard actuating chamber will be vented.

4. In a safety trip valve assembly for controlling the flow of operating fluid such as steam at high temperatures and high pressures, to a turbine, the combination of:

a. valve housing means defining a flow chamber, having an inlet and an outlet in communication with said flow chamber, b. a valve seat disposed in the valve housing means between the inlet and the outlet, and having a valve port therethrough for passing fluid from the inlet to the outlet, c. a trip valve assembly comprising:

1. valve stem means slidably mounted in the valve housing means.

2. valve head means connected to the valve stem means and disposed for engagement with the valve seat to open and close the valve port, and 3. a piston connected inwardly of the end of the valve stem means remote from the valve head means and disposed in sealing engagement with the valve housing means, and d. said piston defining in the valve housing means an inboard chamber on the side thereof nearer the valve head means, and an outboard chamber on the side thereof remote from the valve head means, e. spring means disposed in said valve housing means and in engagement with the piston to bias said valve head means toward open position, f. means in said valve housing means for bleeding operating fluid into said inboard chamber, g. first fluid passage means in said valve stem means including, flow restriction means to meter operating fluid at inlet pressure passing to said outboard chamber when the valve head means is in the open position, and to exhaust fluid from said outboard chamber to the outlet when the valve head means is in the closed position, h. transfer valve means connected to the valve stem on the side of the piston remote from the valve head means, i. second fluid passage means in said valve stem means having an opening at one end disposed for communication with fluid at inlet pressure and an opening at the opposite end disposed for communication with the transfer valve means, j. said transfer valve means operatively associated with said second fluid passage means and said outboard chamber to form a fluid passage connection between said flow chamber and said outboard chamber for providing a net pressure force in said trip valve assembly to prevent movement of the trip valve assembly from its closed position while the transfer valve means is in its open position, k. means responsive to adverse operating conditions to adjustably reduce the fluid pressure in said inboard chamber to a lower pressure than said inlet pressure whereby the valve head means will be moved to engage the valve seat and close the valve port, and l. external positioning means in the valve housing means operable to adjustably engage the transfer valve means and override the response of the transfer valve means to pressures existing when the trip valve assembly is in its closed position, whereby the second fluid passage means is closed and pressures in the inboard and outboard chambers are unbalanced to force the trip valve assembly to follow the external positioning means when adverse operating conditions have been corrected.

* * * * *